(12) United States Patent
Kajitani et al.

(10) Patent No.: US 9,287,533 B2
(45) Date of Patent: Mar. 15, 2016

(54) NON-AQUEOUS SECONDARY BATTERY, MOUNTED UNIT, AND METHOD FOR MANUFACTURING NON-AQUEOUS SECONDARY BATTERY

(75) Inventors: Hiroshi Kajitani, Tokyo (JP); Kentaro Nakahara, Tokyo (JP); Takanori Nishi, Tokyo (JP); Shigeyuki Iwasa, Tokyo (JP); Haruyuki Yoshigahara, Tokyo (JP); Yoichi Shimizu, Tokyo (JP)

(73) Assignee: NEC CORPORATION, Tokyo (JP)

( * ) Notice: Subject to any disclaimer, the term of this patent is extended or adjusted under 35 U.S.C. 154(b) by 132 days.

(21) Appl. No.: 14/116,334

(22) PCT Filed: May 10, 2012

(86) PCT No.: PCT/JP2012/062566
§ 371 (c)(1),
(2), (4) Date: Nov. 7, 2013

(87) PCT Pub. No.: WO2012/153865
PCT Pub. Date: Nov. 15, 2012

(65) Prior Publication Data
US 2014/0079984 A1 Mar. 20, 2014

(30) Foreign Application Priority Data

May 11, 2011 (JP) .................... 2011-105874

(51) Int. Cl.
*H01M 2/02* (2006.01)
*H01M 2/06* (2006.01)
(Continued)

(52) U.S. Cl.
CPC ............ *H01M 2/0212* (2013.01); *H01M 2/021* (2013.01); *H01M 2/026* (2013.01);
(Continued)

(58) Field of Classification Search
None
See application file for complete search history.

(56) References Cited

U.S. PATENT DOCUMENTS

| 6,387,566 | B1 * | 5/2002 | Chang et al. ................ 429/161 |
| 2008/0014498 | A1 * | 1/2008 | Ogawa et al. ................ 429/149 |
| 2008/0171265 | A1 * | 7/2008 | Iriyama et al. ............. 429/231.8 |

FOREIGN PATENT DOCUMENTS

| JP | 9-77960 A | 3/1997 |
| JP | 2000-90889 A | 3/2000 |

(Continued)

OTHER PUBLICATIONS

International Search Report in PCT/JP2012/062566 dated Aug. 7, 2012 (English Translation Thereof).
(Continued)

*Primary Examiner* — Patrick Ryan
*Assistant Examiner* — Christopher Domone
(74) *Attorney, Agent, or Firm* — McGinn IP Law Group, PLLC

(57) ABSTRACT

A non-aqueous secondary battery includes: a positive-electrode collector layer; a positive-electrode layer formed on one surface of the positive-electrode collector layer; a negative-electrode collector layer; a negative-electrode layer formed on one surface of the negative-electrode collector layer so as to be opposed to the positive-electrode layer; a separator provided between the positive-electrode layer and the negative-electrode layer; and a positive-electrode-side insulating layer and a negative-electrode-side insulating layer respectively formed on another surface of the positive-electrode collector layer and another surface of the negative-electrode collector layer. Circumferential inner surfaces of peripheral edges of the positive-electrode collector layer and the negative-electrode collector layer are joined with a sealing agent including at least a positive-electrode fusion layer, a gas barrier layer, and a negative-electrode fusion layer. The positive-electrode-side insulating layer and/or the negative-electrode-side insulating layer has a battery-side recess provided on a surface.

19 Claims, 7 Drawing Sheets

(51) Int. Cl.
*H01M 4/66* (2006.01)
*H01M 2/08* (2006.01)
*H01M 10/052* (2010.01)
*H01M 10/0585* (2010.01)

(52) U.S. Cl.
CPC ........... *H01M 2/027* (2013.01); *H01M 2/0215* (2013.01); *H01M 2/0277* (2013.01); *H01M 2/0285* (2013.01); *H01M 2/0287* (2013.01); *H01M 2/06* (2013.01); *H01M 2/08* (2013.01); *H01M 4/661* (2013.01); *H01M 4/667* (2013.01); *H01M 4/668* (2013.01); *H01M 10/052* (2013.01); *H01M 10/0585* (2013.01); *Y02E 60/122* (2013.01); *Y10T 29/49108* (2015.01)

(56) References Cited

FOREIGN PATENT DOCUMENTS

| | | |
|---|---|---|
| JP | 2000-311673 A | 11/2000 |
| JP | 2001-126713 A | 5/2001 |
| JP | 2003-59486 A | 2/2003 |
| JP | 2005-149833 A | 6/2005 |
| JP | 2005-191288 A | 7/2005 |
| JP | 2005191288 * | 7/2005 |
| JP | 2007-73402 A | 3/2007 |

OTHER PUBLICATIONS

Written Opinion of the ISA (English Translation of the relevant part thereof).

* cited by examiner

NON-AQUEOUS SECONDARY BATTERY, MOUNTED UNIT, AND METHOD FOR MANUFACTURING NON-AQUEOUS SECONDARY BATTERY

TECHNICAL FIELD

This invention relates to a non-aqueous secondary battery, a mounted unit including the non-aqueous secondary battery, and a method of manufacturing a non-aqueous secondary battery.

BACKGROUND ART

As a power source to be used in various mobile devices such as a mobile telephone and a notebook personal computer, a lithium ion secondary battery which is a high energy density non-aqueous secondary battery has been used. The lithium ion secondary battery mainly comprises a cylindrical shape or a rectangular shape, and in most cases, is formed by inserting a wound electrode laminate into a metallic can. Depending on the kind of mobile device, the thickness of the battery is requested to be thin. However, the metallic can formed by deep drawing processing is difficult to have a thickness of 3 mm or less, and hence it is difficult to set the thickness of a secondary battery using a metallic can to 3 mm or less.

On the other hand, in recent years, various types of IC cards and non-contact IC cards have been spread, and most of the non-contact IC cards are designed in such a manner that electric power is generated by an electromagnetic induction coil, and an electric circuit is operated only during use. In order to provide these IC cards with a display function or a sensing function so as to greatly enhance the security and convenience, it is desired that a secondary battery serving as an energy source be built in each IC card. The size of each IC card is standardized to, for example, 85 mm×48 mm×0.76 mm, and hence the thickness of a secondary battery to be built in the IC card is required to be 0.76 mm or less. Further, even in various card-type devices which do not comply with the specification, it is preferred that the thickness of a secondary battery be 2.5 mm or less. Therefore, it is difficult to use the above-mentioned secondary battery using a metallic can.

As a thin non-aqueous secondary battery having a thickness of 2.5 mm or less, there is given a non-aqueous secondary battery including an aluminum laminate film on an exterior body. The aluminum laminate film includes mainly a thermoplastic resin layer, an aluminum foil layer, and an insulating layer, and has a feature of being able to be molded and processed easily while having a sufficient gas barrier property. However, in the case of the thin non-aqueous secondary battery, the proportion of the exterior body occupying the thickness of the entire battery is high, and hence a technology for making the exterior body as thin as possible is required in order to enhance energy density.

Patent Literature 1 discloses an aluminum laminate film with a 7-layer structure including an innermost layer, a first adhesive layer, a first surface treatment layer, an aluminum foil layer, a second surface treatment layer, a second adhesive layer, and an outermost layer, and having excellent moldability, gas barrier property, heat sealing property, and electrolytic solution resistance (Patent Literature 1).

Patent Literature 2 proposes a thin battery which does not require an aluminum laminate by allowing a positive-electrode collector and a negative-electrode collector to serve as an exterior body. In this battery, peripheral edges of the positive-electrode collector and the negative-electrode collector are joined with a sealing agent containing polyolefin or engineering plastic (Patent Literature 2).

Patent Literature 3 also proposes a thin battery which does not require an aluminum laminate by allowing a positive-electrode collector and a negative-electrode collector to serve as an exterior body. This literature proposes that peripheral edges of the positive-electrode collector and the negative-electrode collector are joined with an olefin-based hot melt resin, a urethane-based reaction-type hot melt resin, an ethylene vinyl alcohol based hot melt resin, a polyamide-based hot melt resin, or the like, and these hot melt resins are filled with an inorganic filler (Patent Literature 3).

Further, Patent Literature 4 discloses a structure of an electric double-layer capacitor in which an electrolyte is sandwiched between a positive-electrode collector containing aluminum and a negative-electrode collector similarly containing aluminum, and a gap is filled with a multilayer structure comprising a welded layer and a gas barrier layer (Patent Literature 4). That is, Patent Literature 4 discloses an electric double-layer capacitor in which the positive-electrode collector and the negative-electrode collector are formed of the same aluminum.

CITATION LIST

Patent Literature

Patent Literature 1: Japanese Unexamined Patent Application Publication (JP-A) No. 2007-073402
Patent Literature 2: Japanese Unexamined Patent Application Publication (JP-A) No. Hei 09-077960
Patent Literature 3: Japanese Unexamined Patent Application Publication (JP-A) No. 2003-059486
Patent Literature 4: Japanese Unexamined Patent Application Publication (JP-A) No. 2005-191288

DISCLOSURE OF THE INVENTION

Problem to be Solved by the Invention

However, the inventions described in the above-mentioned literatures have the following problems.

First, in the invention described in Patent Literature 1, in order to provide the aluminum laminate film with a sufficient gas barrier property, it is necessary that the thickness of the aluminum foil layer be at least 8 µm, preferably 30 µm or more. Thus, there is a problem in that the total thickness of the aluminum laminate film becomes at least 73 µm, preferably 100 µm or more.

Further, in the invention described in Patent Literature 2, there are problems such as the adhesiveness of the sealing agent with respect to the collectors, short-circuit between the electrodes, and permeation of gas.

Further, in the invention described in Patent Literature 3, it has been difficult to simultaneously satisfy the high adhesiveness of the resin with respect to the collectors, short-circuit prevention reliability between the electrodes, and a sufficient gas barrier property, similarly to Patent Literature 2.

On the other hand, in the batteries including collectors as described in Patent Literatures 2 to 4, the positive-electrode collector is formed of an aluminum foil in most cases. When this battery is finally connected to a load such as an electric circuit, it is necessary to connect the aluminum foil to a different kind of metal such as a copper wire. In ordinary connection by soldering, aluminum cannot be connected to another wiring, and hence in a positive-electrode collector of a general laminate cell, connection to a nickel tab, nickel plating, or the like is performed, which enables the electric connection through use of a solder or the like.

However, in the solder connection, there is a high risk in that positive-electrode/negative-electrode active material, an electrolytic solution, a separator, and a seal containing a hot melt adhesive having a low melting point in a battery may be degraded due to the influence of heat. In particular, applying very high heat after sealing an electrolytic solution becomes a main factor for degrading battery performance. Therefore, in the case of mounting a battery on a circuit side, the battery is connected by caulking with a metal rivet or the like to a nickel tab connected by soldering to the circuit side in most cases. However, there are problems in long-term reliability of a connected portion and an increase in thickness of the connected portion.

Further, there is also a case where a battery is connected to a circuit side through use of a conductive adhesive such as a silver paste. However, in this case, there are disadvantages that connection resistance cannot be ignored as a flowing current increases, and the electric connection reliability is degraded due to the influence of migration or the like.

This invention has been achieved in view of the above-mentioned reasons, and it is an object of this invention to provide a thin non-aqueous secondary battery having high stability and being excellent in connection reliability with respect to a substrate.

Means to Solve the Problem

In order to achieve the above-mentioned object, according to a first aspect of this invention, there is provided a non-aqueous secondary battery, including: a positive-electrode collector layer; a positive-electrode layer formed on one surface of the positive-electrode collector layer; a negative-electrode collector layer; a negative-electrode layer formed on one surface of the negative-electrode collector layer so as to be opposed to the positive-electrode layer; a separator including an electrolytic solution provided between the positive-electrode layer and the negative-electrode layer; a positive-electrode-side insulating layer formed on another surface of the positive-electrode collector layer; and a negative-electrode-side insulating layer formed on another surface of the negative-electrode collector layer, in which an inner surface of a peripheral edge of the positive-electrode collector layer and an inner surface of a peripheral edge of the negative-electrode collector layer are joined with a sealing agent interposed therebetween, the sealing agent comprising a multilayer structure including at least a positive-electrode fusion layer, a gas barrier layer, and a negative-electrode fusion layer, and the positive-electrode-side insulating layer and/or the negative-electrode-side insulating layer has a battery-side recess provided on a surface on an opposite side of a surface on which the positive-electrode collector layer and/or the negative-electrode collector layer is provided.

According to a second aspect of this invention, there is provided a mounted unit, including: an insulating substrate; positive-electrode wiring and negative-electrode wiring provided on one surface of the insulating substrate; a substrate-side recess provided on another surface of the insulating substrate; and the non-aqueous secondary battery according to the first aspect provided on the insulating substrate, in which the substrate-side recess and the battery-side recess are arranged so as to overlap each other in a planar view, and portions of the positive-electrode wiring and the positive-electrode collector layer, and/or portions of the negative-electrode wiring and the negative-electrode collector layer, which are respectively opposed to the substrate-side recess and the battery-side recess, are connected to each other.

According to a third aspect of this invention, there is provided a mounted unit, including: a positive-electrode collector layer; a positive-electrode layer formed on one surface of the positive-electrode collector layer; a negative-electrode collector layer; a negative-electrode layer formed on one surface of the negative-electrode collector layer so as to be opposed to the positive electrode layer; a separator including an electrolytic solution provided between the positive-electrode layer and the negative-electrode layer; a positive-electrode-side insulating layer formed on another surface of the positive-electrode collector layer; a negative-electrode-side insulating layer formed on another surface of the negative-electrode collector layer; an electronic component arranged on the positive-electrode collector layer and/or the negative-electrode collector layer; a first sealing agent comprising a multilayer structure including a positive-electrode fusion layer, a gas barrier layer, and a negative-electrode fusion layer, the first sealing agent being provided on an inner surface of a peripheral edge of the positive-electrode collector layer and an inner surface of a peripheral edge of the negative-electrode collector layer so as to surround the positive-electrode layer, the negative-electrode layer, and the separator; and a second sealing agent including a positive-electrode fusion layer, a gas barrier layer, and a negative-electrode fusion layer, the second sealing agent being provided on an inner surface of a peripheral edge of the positive-electrode-side insulating layer and an inner surface of a peripheral edge of the negative-electrode-side insulating layer so as to surround the first sealing agent and the electronic component.

According to a fourth aspect of this invention, there is provided a method of manufacturing a non-aqueous secondary battery, including: forming a positive-electrode layer on one surface of a positive-electrode collector layer; forming a negative-electrode layer on one surface of a negative-electrode collector layer so that the negative-electrode layer is opposed to the positive-electrode layer; providing a separator between the positive-electrode layer and the negative-electrode layer; forming a positive-electrode-side insulating layer having a recess on another surface of the positive-electrode collector layer; forming a negative-electrode-side insulating layer having a recess on another surface of the negative-electrode collector layer; and joining a film-shaped sealing agent comprising a multilayer structure including at least a positive-electrode fusion layer, a gas barrier layer, and a negative-electrode fusion layer to an inner surface of a peripheral edge of the positive-electrode collector layer and an inner surface of a peripheral edge of the negative-electrode collector layer by thermal fusion bonding after molding the sealing agent into a peripheral edge shape with a center portion thereof punched out and interposing the sealing agent between the positive-electrode collector layer and the negative-electrode collector layer.

Effect of the Invention

According to this invention, it is possible to provide the thin non-aqueous secondary battery having high stability and being excellent in connection reliability with respect to a substrate.

BEST MODE FOR EMBODYING THE INVENTION

Preferred embodiments of this invention are hereinafter described in detail with reference to the drawings.

[Structure]

First, an outline of a structure of a non-aqueous secondary battery 100 according to a first embodiment of this invention is described with reference to FIGS. 1 and 2.

Figure 1:
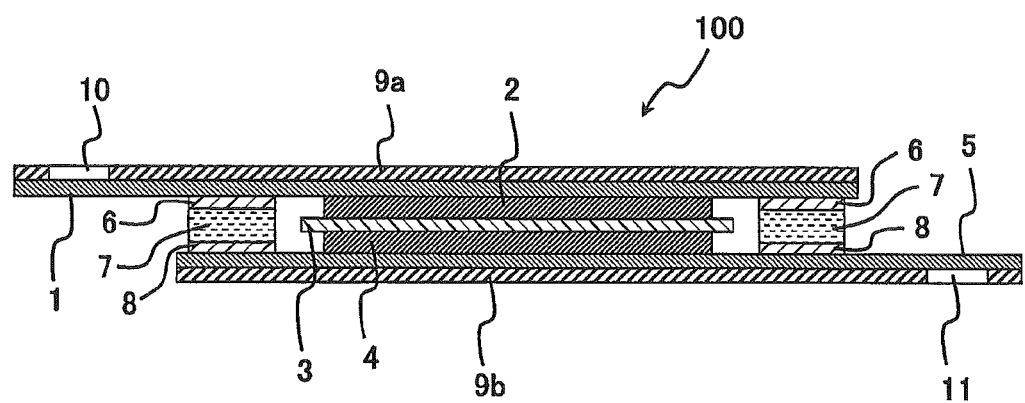
FIG. 1 is a sectional view of a non-aqueous secondary battery 100 according to a first embodiment of this invention.

As illustrated in FIG. 1, the non-aqueous secondary battery 100 includes a positive-electrode collector layer 1, a positive-electrode layer 2 formed on one surface of the positive-electrode collector layer 1, a negative-electrode collector layer 5, a negative-electrode layer 4 formed on one surface of the negative-electrode collector layer 5 so as to be opposed to the positive-electrode layer 2, a separator 3 that contains an electrolytic solution and is provided between the positive-electrode layer 2 and the negative-electrode layer 4, a positive-electrode-side insulating layer 9a formed on the other surface of the positive-electrode collector layer 1, and a negative-electrode-side insulating layer 9b formed on the other surface of the negative-electrode collector layer 5.

Figure 2:
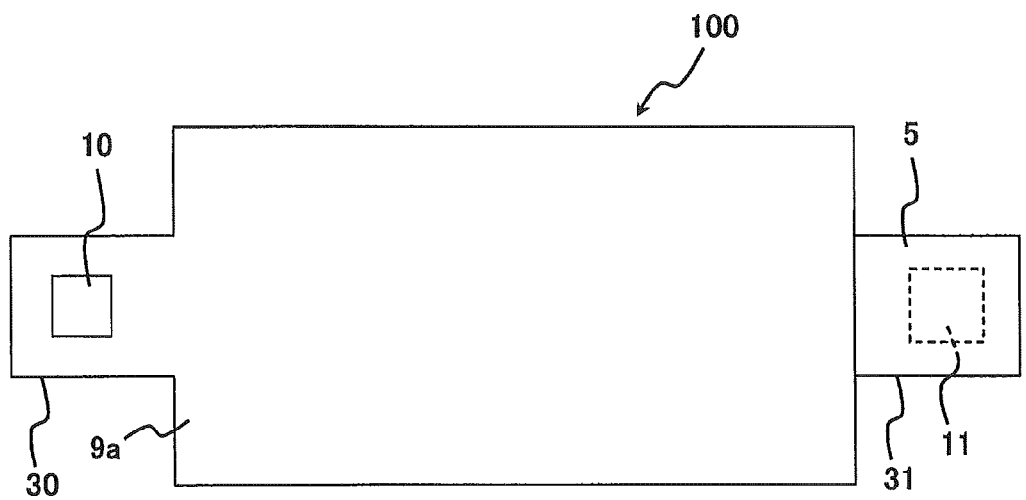
FIG. 2 is a plan view of FIG. 1.

Further, as illustrated in FIG. 2, the positive-electrode-side insulating layer 9a and the negative-electrode-side insulating layer 9b respectively comprise a positive-electrode-side connecting tab 30 and a negative-electrode-side connecting tab 31 as connecting tabs, and the positive-electrode-side connecting tab 30 and the negative-electrode-side connecting tab 31 are respectively provided with battery-side recesses 10 and 11 on surfaces opposite to those on which the positive-electrode collector layer 1 and the negative-electrode collector layer 5 are provided. That is, the positive-electrode-side insulating layer 9a and the negative-electrode-side insulating layer 9b respectively have the battery-side recesses 10 and 11.

As illustrated in FIG. 2, the positive-electrode-side connecting tab 30 and the negative-electrode-side connecting tab 31 are arranged at different positions in a planar view.

Specifically, as illustrated in FIG. 2, the positive-electrode-side insulating layer 9a and the negative-electrode-side insulating layer 9b comprise parts in a rectangular shape (rectangular parts) opposed to each other, and the positive-electrode-side connecting tab 30 and the negative-electrode-side connecting tab 31 protrude respectively from opposed sides of the rectangular parts.

Further, in FIG. 2, the battery-side recesses 10 and 11 are openings. The positive-electrode collector layer 1 and the negative-electrode collector layer 5 are respectively exposed to the positive-electrode-side insulating layer 9a side and the negative-electrode-side insulating layer 9b side from the battery-side recesses 10 and 11.

The outline of the structure of the non-aqueous secondary battery 100 is as described above.

Next, each constituent member of the non-aqueous secondary battery 100 is described in more detail.

The positive-electrode layer 2 contains an active material. As the active material contained in the positive-electrode layer 2, for example, lithium manganate such as $LiMn_2O_4$, which is an oxide having a spinel structure, can be used. However, the active material is not necessarily limited thereto, and for example, $LiNi_{0.5}Mn_{1.5}O_4$, which is also an oxide having a spinel structure, $LiFePO_4$, $LiMnPO_4$, and $Li_2CoPO_4F$, which are oxides having an olivine structure, $LiCoO_2$, $LiNi_{1-x-y}Co_xAl_yO_2$, and $LiNi_{0.5-x}Mn_{0.5-x}Co_{2x}O_2$, which are oxides having a layered rock-salt structure, solid solutions of these oxides having a layered rock-salt structure and $Li_2MnO_3$, sulfur, a nitroxyl radical polymer, and the like can also be used. Further, a plurality of kinds of those positive-electrode active materials may be used in combination. In particular, a nitroxyl radical polymer is a flexible positive-electrode active material, unlike other oxides, and hence is preferred as a positive-electrode active material for a flexible thin non-aqueous secondary battery to be built in an IC card.

The content of an active material in the positive electrode is, for example, 90 wt %, but can be adjusted arbitrarily. When the content of the active material is 10% by weight or more with respect to the total weight of the positive electrode, a sufficient capacity is obtained. Further, in the case where it is desired to obtain a largest possible capacity, it is preferred that the content of the active material be 50% by weight or more, in particular, 80% by weight or more.

In order to impart conductivity to the positive-electrode layer 2, the positive-electrode layer 2 contains a conductivity-imparting agent. As the conductivity-imparting agent, for example, graphite powder having an average particle diameter of 6 μm and acetylene black can be used, but a conventionally known conductivity-imparting agent material may be used. As the conventionally known conductivity-imparting agent, for example, there may be given carbon black, furnace black, a vapor grown carbon fiber, carbon nanotube, carbon nanohorn, metal powder, and a conductive polymer.

In order to bind the above-mentioned materials, the positive-electrode layer 2 contains a binder. As the binder, for example, polyvinylidene fluoride can be used, and conventionally known binders may be used. Examples of the conventionally known binders include polytetrafluoroethylene, a vinylidene fluoride-hexafluoropropylene copolymer, a styrene-butadiene copolymer rubber, polypropylene, polyethylene, polyacrylonitrile, and an acrylic resin.

As described later, the positive-electrode layer 2 can be produced, for example, by dispersing the above-mentioned materials in a solvent to prepare a positive-electrode ink, printing and applying the positive-electrode ink to the positive-electrode collector layer, and removing a dispersion solvent by heat-drying. As the dispersion solvent of the positive-electrode ink, conventionally known solvents, specifically, N-methylpyrrolidone (NMP), water, tetrahydrofuran, and the like can be used.

The negative-electrode layer 4 contains an active material. As the negative-electrode active material contained in the negative-electrode layer 4, graphite such as a mesocarbon microbead (hereinafter referred to as "MCMB") can be used. However, the negative-electrode active material is not necessarily limited thereto. For example, graphite can also be replaced by a conventionally known negative-electrode active material. As the conventionally known negative-electrode active materials, for example, there are given carbon materials such as activated carbon and hard carbon, a lithium metal, a lithium alloy, lithium ion occluding carbon, and other various kinds of simple metals and alloys.

In order to impart conductivity to the negative-electrode layer 4, the negative-electrode layer 4 contains a conductivity-imparting agent. As the conductivity-imparting agent, for example, a conductivity-imparting agent containing acetylene black as a main component can be used, but a conventionally known conductivity-imparting agent may be used. As the conventionally known conductivity-imparting agent, for example, there may be given carbon black, acetylene black, graphite, furnace black, a vapor grown carbon fiber, carbon nanotube, carbon nanohorn, metal powder, and a conductive polymer.

In order to bind the above-mentioned materials, the negative-electrode layer 4 contains a binder. As the binder, for example, polyvinylidene fluoride can be used, and conventionally known binders may be used. Examples of the conventionally known binders include polytetrafluoroethylene, a vinylidene fluoride-hexafluoropropylene copolymer, a styrene-butadiene copolymer rubber, polypropylene, polyethylene, polyacrylonitrile, and an acrylic resin.

As described later, the negative-electrode layer 4 can be produced, for example, by dispersing the above-mentioned materials in a solvent to prepare a negative-electrode ink, printing and applying the negative-electrode ink to the negative-electrode collector layer, and removing a dispersion solvent by heat-drying. As the dispersion solvent of the negative-electrode ink, conventionally known solvents, for example, NMP, water, tetrahydrofuran, and the like can be used.

The separator 3 in this invention is interposed between the positive-electrode layer 2 and the negative-electrode layer 4, and serves to conduct only ions without conducting electrons by containing the electrolytic solution. No particular limitation is imposed on a material for the separator 3 in this invention, and conventionally known materials can be used. As specific materials, there are given a polyolefin such as polypropylene and polyethylene, a porous film such as a fluorine resin, a non-woven fabric, and a glass filter.

The electrolytic solution carries and transports charge between the positive-electrode layer 2 and the negative-electrode layer 4, and in general, those which have ion conductivity of $10^{-5}$ to $10^{-1}$ S/cm at room temperature are used. As the electrolytic solution, for example, a mixed solvent of ethylene carbonate (EC) and diethyl carbonate (DEC) containing 1.0 M lithium hexafluorophosphate (LiPF$_6$) as a supporting electrolyte (mixed volume ratio of EC/DEC=3/7) is used, and conventionally known electrolytic solutions may be used. As the conventionally known electrolytic solutions, there may be used, for example, an electrolytic solution obtained by dissolving an electrolyte salt in a solvent. Examples of such solvent include: organic solvents such as ethylene carbonate, propylene carbonate, dimethyl carbonate, diethyl carbonate, methyl ethyl carbonate, γ-butyrolactone, tetrahydrofuran, dioxolane, sulfolane, dimethylformamide, dimethylacetamide, and N-methyl-2-pyrrolidone; and a sulfuric acid aqueous solution, and water. In this invention, those solvents may be used alone or two or more kinds thereof may be used in combination. In addition, examples of the electrolyte salt include lithium salts such as LiPF$_6$, LiClO$_4$, LiBF$_4$, LiCF$_3$SO$_3$, LiN(CF$_3$SO$_2$)$_2$, LiN(C$_2$F$_5$SO$_2$)$_2$, LiC(CF$_3$SO$_2$)$_3$, and LiC(C$_2$F$_5$SO$_2$)$_3$. In addition, the concentration of the electrolyte salt is not particularly limited to 1.0 M.

It is desired that the positive-electrode collector layer 1 be formed of a material containing aluminum as a main component, for example, an aluminum foil. However, the material for the positive-electrode collector layer 1 is not particularly limited to aluminum, and conventionally known materials can be used. Specific examples for the material include nickel, copper, gold, silver, titanium, and an aluminum alloy. The thickness of the positive-electrode collector layer 1 is, for example, about 40 μm, and is not necessarily limited thereto. Note that, the thickness is preferably 12 μm or more, more preferably 30 μm or more from the viewpoint of permeability of gas. The thickness is preferably 100 μm or less, more preferably 68 μm or less from the viewpoint of energy density.

It is desired that the negative-electrode collector layer 5 be formed of a material containing copper as a main component, for example, a copper foil. However, the material for the negative-electrode collector layer 5 is not particularly limited to copper, and conventionally known materials can be used. Specific examples for the material include nickel, aluminum, gold, silver, titanium, and an aluminum alloy. The thickness of the negative-electrode collector layer 5 is, for example, about 18 μm, and is not necessarily limited thereto. Note that, the thickness is preferably 8 μm or more, more preferably 15 μm or more from the viewpoint of permeability of gas. The thickness is preferably 50 μm or less, more preferably 30 μm or less from the viewpoint of energy density.

The sealing agent serves to prevent water vapor of ambient air or the like from coming into contact with power-generation elements (positive-electrode layer 2, negative-electrode layer 4, separator 3, etc.) of the thin non-aqueous secondary battery, and comprises a multilayer structure including at least a positive-electrode fusion layer 6, a gas barrier layer 7, and a negative-electrode fusion layer 8. The sealing agent may comprise a multilayer structure of 4 or more layers by using an adhesive layer between the respective layers or using a plurality of fusion layers or gas barrier layers 7. The case where respective layers are stacked separately to be integrated or the case where a sealing agent with a multilayer structure is prepared in advance and inserted between the positive-electrode collector layer 1 and the negative-electrode collector layer 5 are considered. The same effects can be expected as a result, as long as a sealing agent with a multilayer structure including at least the positive-electrode fusion layer 6, the gas barrier layer 7, and the negative electrode fusion layer 8 is used. However, from the viewpoint of processability, it is preferred that a three-layer film of modified polyolefin resin/liquid crystal polyester/modified polyolefin or a three-layer film of ionomer resin/liquid crystal polyester resin/ionomer resin be interposed to be used between the positive-electrode collector layer 1 and the negative-electrode collector layer 5.

Note that, the modified polyolefin resin refers to a resin obtained, for example, by graft-modifying polyethylene or polypropylene with a polar group such as maleic anhydride, acrylic acid, or glycidylmethacrylic acid, and the ionomer resin refers to a resin having a special structure, for example, in which molecules of an ethylene-methacrylic acid copolymer or an ethylene-acrylic acid copolymer are bonded with metal ions of sodium, zinc, or the like.

The gas barrier layer 7 serves to prevent the permeation of water vapor gas from an outside to the inside of the battery, and prevent short-circuit between the positive-electrode collector layer 1 and the negative-electrode collector layer 5. Although no particular limitation is imposed on the material for the gas barrier layer 7, a liquid crystal polyester resin is preferred because it is excellent in a gas barrier property and insulation, and has flexibility and bending resistance.

The term "liquid crystal polyester resin" is a collective term including a liquid crystal polymer (thermotropic liquid crystal polymer) such as a thermotropic liquid crystal polyester or a liquid crystal polyester amide (thermotropic liquid crystal polyester amide), which is synthesized from monomers such as an aromatic dicarboxylic acid, an aromatic diol, and an aromatic hydroxycarboxylic acid as main monomers. Typical examples of the liquid crystal polyester resin include: type I (following formula 1) synthesized from parahydroxybenzoic acid (PHB), terephthalic acid, and 4,4'-biphenol; type II (following formula 2) synthesized from PHB and 2,6-hydroxynaphthoic acid; and type III (following formula 3) synthesized from PHB, terephthalic acid, and ethylene glycol. As the liquid crystal polyester resin in this invention, any of the type I to type III may be used. However, from the viewpoint of heat resistance, size stability, and water vapor barrier property, it is preferred that the liquid crystal polyester resin be wholly aromatic liquid crystal polyester (type I and type II) or wholly aromatic liquid crystal polyester amide. Further, the liquid crystal polyester resin in this invention also includes a polymer blend with another component containing a liquid crystal polyester resin at a ratio of 60 wt % or more, and a mixed composition with an inorganic filler or the like.

in a gas barrier property. Thus, the thickness of the gas barrier layer 7 is, for example, 1 μm or more and 700 μm or less, preferably 5 μm or more and 200 μm or less, more preferably 10 μm or more and 100 μm or less, most preferably 10 μm or more and 60 μm or less.

The positive-electrode fusion layer 6 and the negative-electrode fusion layer 8 serve to fuse the gas barrier layer 7 to the positive-electrode collector layer 1 and fuse the gas barrier layer 7 to the negative-electrode collector layer 5. Although no particular limitation is imposed on materials for the positive-electrode fusion layer 6 and the negative-electrode fusion layer 8, for example, there are given a modified polyolefin resin, an ionomer resin, and the like. These resins may be used alone or in combination of several kinds for the positive-electrode fusion layer 6 and the negative-electrode fusion layer 8 in this invention. The resins to be used in the positive-electrode fusion layer 6 and the negative-electrode fusion layer 8 have a gas barrier property inferior to that of the resin used in the gas barrier layer 7, but have an excellent heat sealing property. Thus, by using the resins to be used in the positive-electrode fusion layer 6 and the negative-electrode fusion layer 8 simultaneously with the resin for the gas barrier layer 7, both an excellent gas barrier property and heat sealing property can be satisfied.

The positive-electrode-side insulating layer 9a and the negative-electrode-side insulating layer 9b prevent short-circuit during an operation, and for example, a liquid crystal polymer resin (LCP) such as a liquid crystal polyester resin is used for these layers.

The positive-electrode-side connecting tab 30, the negative-electrode-side connecting tab 31, and the battery-side

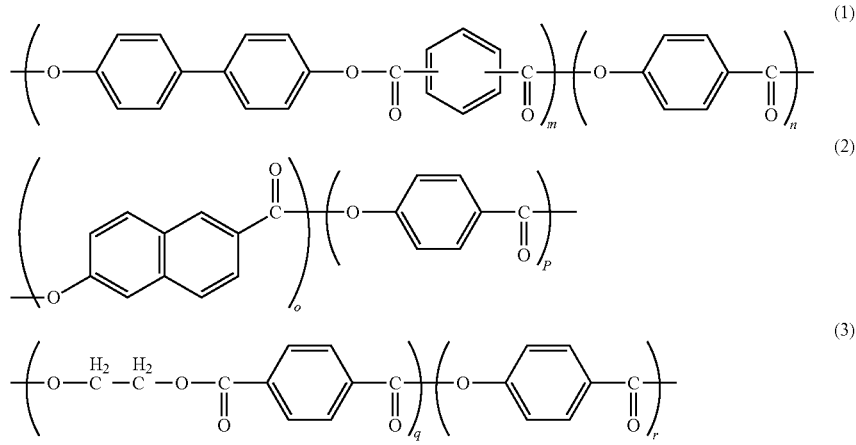

Although the form of the gas barrier layer 7 is not particularly limited, it is preferred that the gas barrier layer 7 be a film which is easy to be processed. The film in this invention is a concept including a sheet, a plate, and a foil (in particular, regarding a constituent material for a metal layer). In order to obtain such a base, a conventionally known production method in accordance with a resin forming the base can be used. Further, as a film using the above-mentioned liquid crystal polyester resin which is particularly preferred in this invention, for example, there is given "BIAC-CB (trade name)" manufactured by Japan Gore-Tex Inc. No particular limitation is imposed on the thickness of the gas barrier layer 7 in this invention. However, when the gas barrier layer 7 is too thin, there arises a problem of an insulating property, and when the gas barrier layer 7 is too thick, there arises a problem recesses 10 and 11 are portions formed to connect the positive-electrode collector layer 1 and the negative-electrode collector layer 5 to external wiring such as wiring of a substrate described later.

Specifically, the positive-electrode collector layer 1 and the negative-electrode collector layer 5 are brought into contact with external wiring, and the positive-electrode collector layer 1 and the negative-electrode collector layer 5 exposed from the battery-side recesses 10 and 11 are irradiated with an ultrasonic wave (ultrasonic method) or supplied with a current (electric welding method), to thereby fuse the positive-electrode collector layer 1 and the negative-electrode collector layer 5 to the external wiring.

Accordingly, due to the presence of the battery-side recesses 10 and 11, electrical connection is realized at temperatures lower than that for solder connection by the ultrasonic method or the electric welding method. Therefore, unlike the solder connection, materials forming a battery (positive-electrode active material, negative-electrode active material, separator, electrolytic solution, sealing agent) are not degraded due to heat generated during connection.

Further, compared to the rivet connection or the connection using a conductive adhesive, connection reliability can be enhanced.

Note that, as a method for forming the battery-side recesses 10 and 11 in the case of using the LCP for the positive-electrode-side insulating layer 9a and the negative-electrode-side insulating layer 9b, there are given a method involving forming a hole in an LCP by punching, cutout, or router processing in advance, and then forming an aluminum foil or a copper foil to be a collector, and a method involving attaching an aluminum foil or a copper foil to an LCP, irradiating an intended position with laser light, and locally removing only an LCP portion.

Further, in the case of using the ultrasonic method as a fusion method, the battery-side recesses 10 and 11 are not necessarily required to be opened, and hence a thin LCP may remain on the bottom surfaces of the battery-side recesses 10 and 11.

Note that, in the case where a metal surface to be used in the negative-electrode collector layer 5 is made of copper, the copper foil surface or side surface of a lead portion for external connection or a portion outside a portion sealed with a sealing agent may be corroded. The possibility of the corrosion becomes high, in particular, under high-temperature and high-humidity conditions. When the corrosion of the copper surface proceeds, the adhesion state between the copper and the sealing agent is damaged, which leads to risks that moisture and the like in the atmosphere enter the battery to degrade the electrolytic solution and the outflow of the electrolytic solution itself may alternatively degrade battery performance.

Figure 11A:
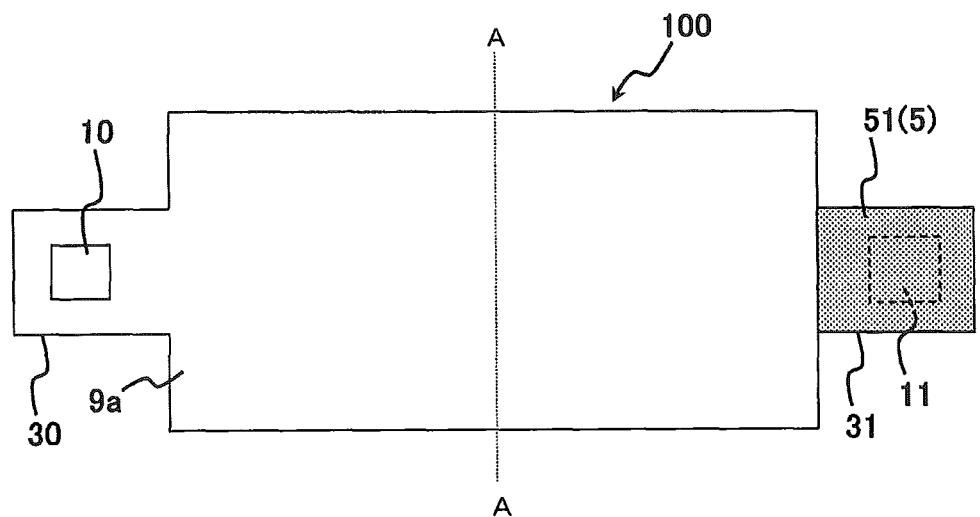
FIG. 11A is a plan view illustrating a modified example of the non-aqueous secondary battery 100 according to the first embodiment in which coating is applied to the surface of a negative-electrode collector layer 5 and a portion hatched in a pointillist manner indicates a coating material 51.
Figure 11B:
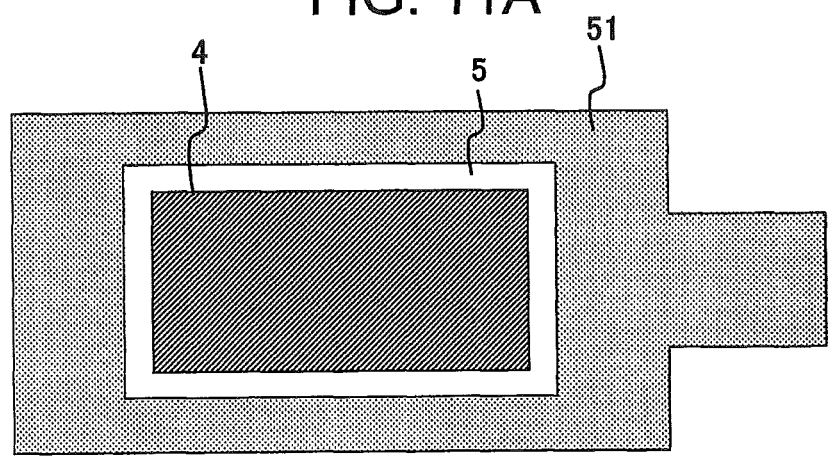
FIG. 11B is a plan view of the negative-electrode collector layer 5 and a negative-electrode layer 4 of FIG. 11A.
Figure 11C:
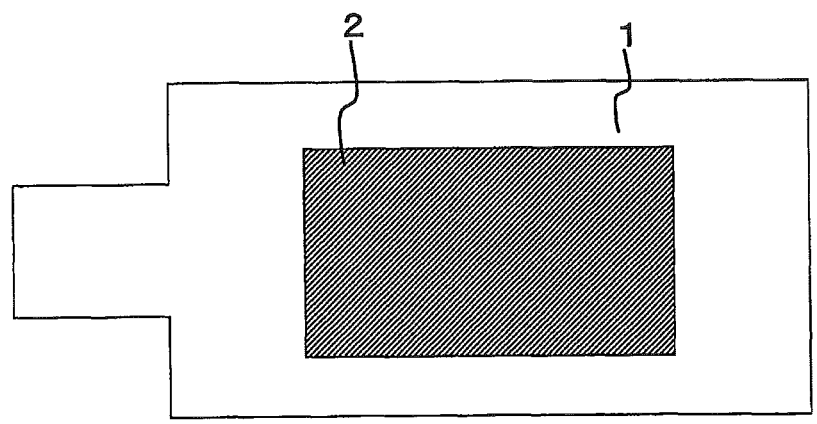
FIG. 11C is a plan view of a positive-electrode collector layer 1 and a positive-electrode layer 2 of FIG. 11A.
Figure 12:
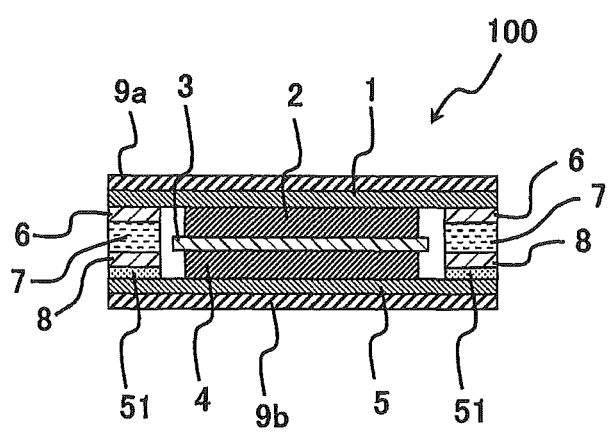
FIG. 12 is a sectional view taken along line A-A of FIG. 11A.

The above-mentioned degradation of the battery caused by corrosion can be avoided by coating at least a part of the surface of the negative-electrode collector layer 5 formed of copper with a coating material 51 which has conductivity and resistance to corrosion, such as nickel (or nickel and gold), as illustrated in FIGS. 11A to 12, and thus, a secondary battery with high stability can be provided. Note that, although only an outer circumference of the negative-electrode collector layer 5 is coated with the coating material 51 in FIGS. 11A to 12, the entire surface of the negative-electrode collector layer 5 may be coated so as to reduce the production cost.

[Production Method]

Next, an example of a production method according to a first embodiment of this invention is described.

<Production of Positive-electrode Layer>

The positive-electrode layer 2 containing 90 wt % of lithium manganate having a spinel structure, 5 wt % of graphite powder having an average particle diameter of 6 μm, 2 wt % of acetylene black, and 3 wt % of polyvinylidene fluoride (hereinafter referred to as "PVDF") was produced on an aluminum foil (positive-electrode collector layer 1) having a thickness of 40 μm, a rear surface of the aluminum foil having attached thereto a liquid crystal polyester (positive-electrode-side insulating layer 9a) having a thickness of 50 μm.

<Production of Negative-electrode Layer>

The negative-electrode layer 4 containing 88 wt % of mesocarbon microbeads (hereinafter referred to as "MCMB") manufactured by Osaka Gas, Co., Ltd. graphitized at 2,800° C., 2 wt % of acetylene black, and 10 wt % of PVDF was produced on a copper foil (negative-electrode collector layer 5) having a thickness of 18 μm, a rear surface of the copper foil having attached thereto a liquid crystal polyester (negative-electrode-side insulating layer 9b) having a thickness of 50 μm.

<Production of Secondary Battery>

The positive-electrode layer 2 and the negative-electrode layer 4 produced by the above-mentioned methods were opposed to each other with the separator 3 that contains an electrolytic solution interposed between the electrodes and with a film obtained by molding the sealing agent including three layers of "modified polyolefin resin/liquid crystal polyester resin/modified polyolefin resin (positive-electrode fusion layer 6/gas barrier layer 7/negative-electrode fusion layer 8)" into a frame-like shape (peripheral edge shape with a center portion punched out) interposed between the peripheral edges of the electrode layers. The composition of the electrolytic solution was a mixed solvent (mixed volume ratio of EC/DEC=3/7) of ethylene carbonate (hereinafter referred to as "EC") and diethyl carbonate (hereinafter referred to as "DEC") containing 1.0 M of $LiPF_6$ as a supporting electrolyte.

Finally, the battery-side recesses 10 and 11 were formed in a part of the liquid crystal polyester.

The non-aqueous secondary battery 100 was produced by the foregoing procedure.

Thus, according to the first embodiment, the non-aqueous secondary battery 100 includes the positive-electrode collector layer 1, the positive-electrode layer 2 formed on one surface of the positive-electrode collector layer 1, the negative-electrode collector layer 5, the negative-electrode layer 4 formed on one surface of the negative-electrode collector layer 5 so as to be opposed to the positive-electrode layer 2, the separator 3 that contains an electrolytic solution and is provided between the positive-electrode layer 2 and the negative-electrode layer 4, the positive-electrode-side insulating layer 9a formed on the other surface of the positive-electrode collector layer 1, and the negative-electrode-side insulating layer 9b formed on the other surface of the negative-electrode collector layer 5. The positive-electrode-side insulating layer 9a and the negative-electrode-side insulating layer 9b comprise the positive-electrode-side connecting tab 30 and the negative-electrode-side connecting tab 31, and the battery-side recesses 10 and 11 are respectively provided on surfaces of the positive-electrode-side connecting tab 30 and the negative-electrode-side connecting tab 31 on an opposite side of surfaces on which the positive-electrode collector layer 1 and the negative-electrode collector layer 5 are provided.

Therefore, the non-aqueous secondary battery 100 has high stability and is excellent in connection reliability with respect to a substrate.

Next, a second embodiment of this invention is described with reference to FIGS. 3 to 7.

In the second embodiment, the non-aqueous secondary battery 100 according to the first embodiment is mounted on a substrate 101 to obtain a mounted unit 200.

Note that, in the second embodiment, elements having functions similar to those of the first embodiment are denoted with the same reference numerals as those therein, and the descriptions thereof are omitted.

First, a structure of the mounted unit 200 is described with reference to FIGS. 3 and 4.

Figure 3:
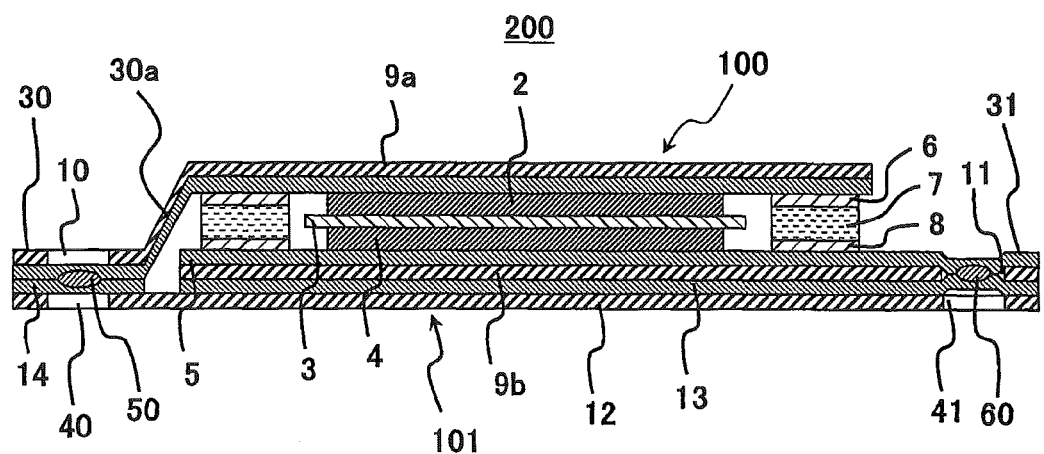
FIG. 3 is a sectional view illustrating a mounted unit 200 according to a second embodiment of this invention.

As illustrated in FIG. 3, the mounted unit 200 according to the second embodiment includes the substrate 101 and the non-aqueous secondary battery 100 mounted on the substrate 101.

The substrate 101 includes an insulating substrate 12 and negative-electrode wiring 13 and positive-electrode wiring 14 provided on one surface of the insulating substrate 12.

Further, substrate-side recesses 40 and 41 are provided on the insulating substrate 12, and in FIG. 3, the positive-electrode wiring 14 and the negative-electrode wiring 13 are exposed to the other surface side of the insulating substrate 12 from the substrate-side recesses 40 and 41.

The substrate-side recesses 40 and 41 are provided at positions so that the substrate-side recesses 40 and 41 are respectively opposed to the positive-electrode wiring 14 and the negative-electrode wiring 13, and respectively have positional relationships (distance, arrangement, etc.) corresponding to the positional relationship of the battery-side recesses 10 and 11 of the non-aqueous secondary battery 100.

Specifically, when the non-aqueous secondary battery 100 is mounted on the substrate 101, the substrate-side recess 40 and the substrate-side recess 41 are respectively opposed to the battery-side recess 10 and the battery-side recess 11 (respectively overlap the battery-side recess 10 and the battery-side recess 11 in a planar view).

Further, the negative-electrode wiring 13 is held in contact with the negative-electrode collector layer 5, and the positive-electrode wiring 14 is held in contact with the positive-electrode collector layer 1.

Note that, in FIG. 3, a root 30a of the positive-electrode-side connecting tab 30 is bent toward the substrate 101 side to press the positive-electrode-side connecting tab 30 against the substrate 101, and thus the positive-electrode wiring 14 and the positive-electrode collector layer 1 are brought into contact with each other.

Further, in FIG. 3, portions of the negative-electrode wiring 13 and the negative-electrode collector layer 5, which are respectively opposed to the substrate-side recess 41 and the battery-side recess 11 (respectively overlapping the substrate-side recess 41 and the battery-side recess 11 in a planar view), are bent into the battery-side recess 11, and thus the negative-electrode wiring 13 and the negative-electrode collector layer 5 are brought into contact with each other.

Further, the portions of the positive-electrode wiring 14 and the positive-electrode collector layer 1, which are respectively opposed to the substrate-side recess 40 and the battery-side recess 10 (respectively overlapping the substrate-side recess 40 and the battery-side recess 10 in a planar view), are connected to each other by an ultrasonic method or an electric welding method to form a connected portion 50.

Similarly, the portions bent into the battery-side recess 11 of the negative-electrode wiring 13 and the negative-electrode collector layer 5 are connected to each other by an ultrasonic method or an electric welding method to form a connected portion 60.

Note that, as described in the first embodiment, in the case where the connected portions 50 and 60 are formed by the ultrasonic method, the substrate-side recesses 40 and 41 are not necessarily required to be opened, and hence the bottom surfaces thereof may be thinly left without opening the substrate-side recesses 40 and 41.

Figure 4:
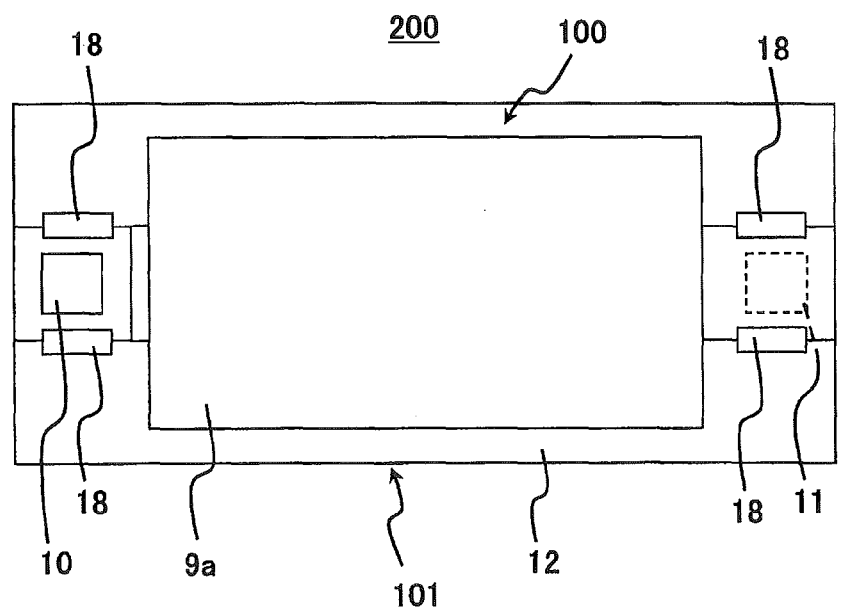
FIG. 4 is a plan view of FIG. 3.

On the other hand, as illustrated in FIG. 4, the positive-electrode-side connecting tab 30 and the negative-electrode-side connecting tab 31 are fixed to the substrate 101 with an insulating protective seal 18. Owing to such reinforcement, the reliability of the electrical connected portions can be enhanced. Note that, although an example of fixing the positive-electrode-side connecting tab 30 and the negative-electrode-side connecting tab 31 with the insulating protective seal 18 is illustrated, any method or any material may be used as long as the positive-electrode-side connecting tab 30 and the negative-electrode-side connecting tab 31 can be fixed to the substrate 101.

Note that, in the second embodiment, the battery-side recess 10 is formed so as to be smaller than the battery-side recess 11. In other words, the battery-side recess 11 is formed so as to be larger than the battery-side recess 10. The reason for this is as follows. As is apparent from FIG. 3, the positive-electrode collector layer 1 and the positive-electrode wiring 14 comprise a structure capable of coming into close contact with each other, whereas the negative-electrode collector layer 5 and the negative-electrode wiring 13 come into contact with each other in the battery-side recess 11. Therefore, as described above, it is necessary to bend the negative-electrode collector layer 5 and the negative-electrode wiring 13 by the thickness of the battery-side recess 11.

Accordingly, by setting the sizes of the battery-side recess 10 and the battery-side recess 11 as described above, the reliability of the connected portions can be enhanced.

Next, a method of mounting the non-aqueous secondary battery 100 onto the substrate 101 is described with reference to FIGS. 3 to 7.

Figure 5:
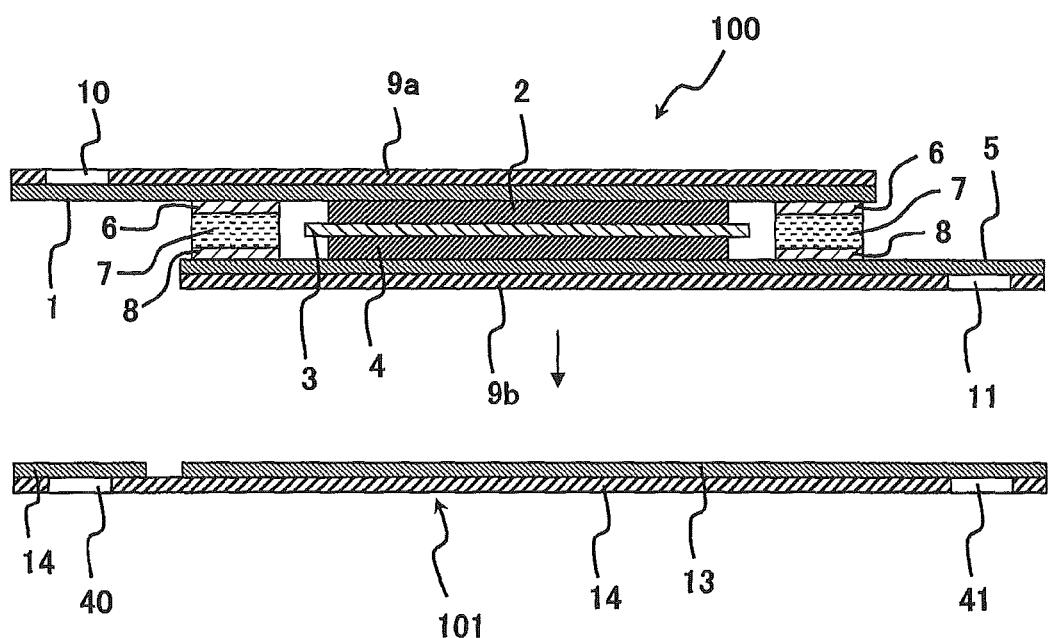
FIG. 5 is a sectional view illustrating a procedure for producing the mounted unit 200.

First, as illustrated in FIG. 5, the substrate 101 and the non-aqueous secondary battery 100 are prepared and arranged so that the substrate-side recess 40 corresponds to (overlaps) the battery-side recess 10 and the substrate-side recess 41 corresponds to (overlaps) the battery-side recess 11 in a planar view, and the negative-electrode-side insulating layer 9b and the negative-electrode wiring 13 are opposed to each other.

Figure 6:
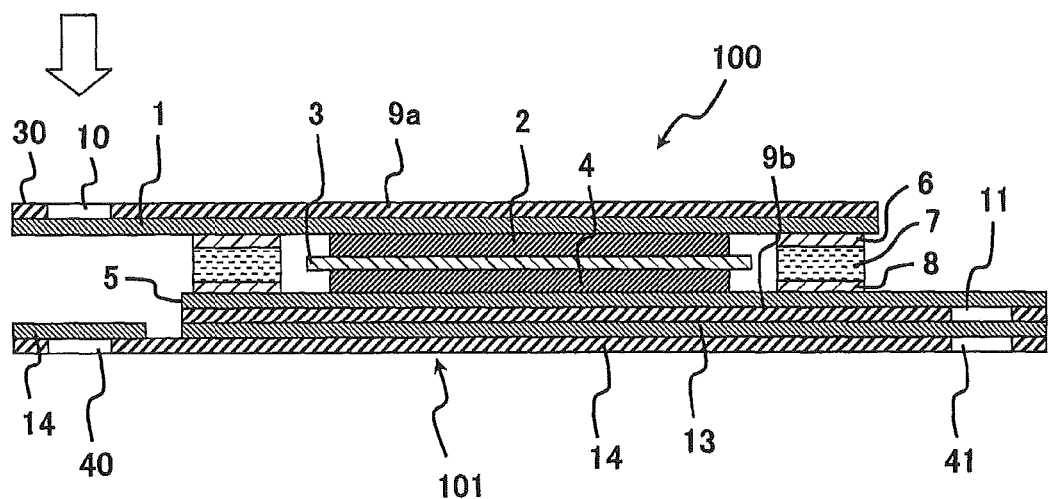
FIG. 6 is a sectional view illustrating the procedure for producing the mounted unit 200.

Next, the non-aqueous secondary battery 100 is relatively moved in an arrow direction of FIG. 5 in the above-mentioned state, and the negative-electrode-side insulating layer 9b is brought into contact with the negative-electrode wiring 13 as illustrated in FIG. 6. Thus, the non-aqueous secondary battery 100 is mounted on the substrate 101.

Figure 7:
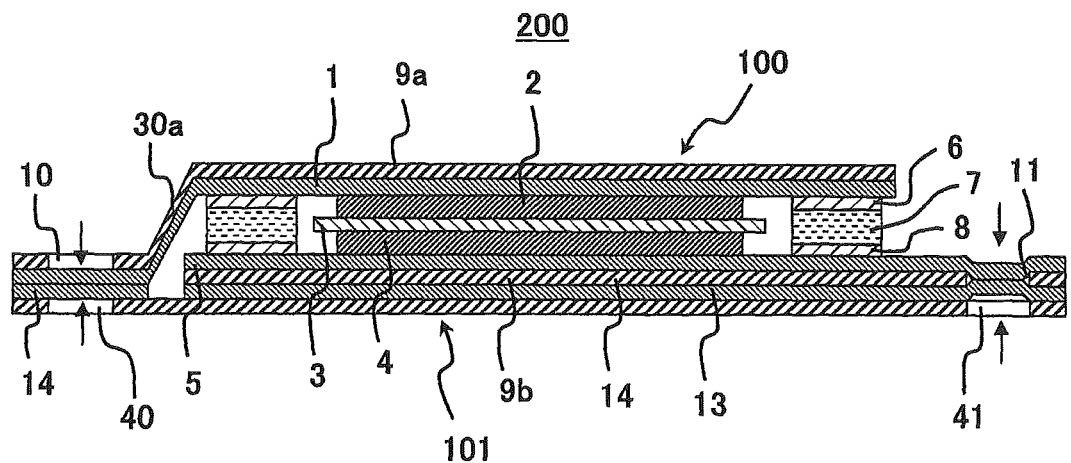
FIG. 7 is a sectional view illustrating the procedure for producing the mounted unit 200.

Then, as indicated by a white arrow of FIG. 6, a force is applied to the positive-electrode-side connecting tab 30 to bend the root 30a (see FIG. 3) toward the substrate 101 side (in a crank shape), and the positive-electrode wiring 14 and the positive-electrode collector layer 1 are brought into contact with each other as illustrated in FIG. 7 while the substrate-side recess 40 and the battery-side recess 10 are opposed to each other (overlap each other in a planar view).

Further, the negative-electrode wiring 13 exposed from the substrate-side recess 41 and the negative-electrode collector layer 5 exposed from the battery-side recess 11 are bent into the battery-side recess 11 to bring the negative-electrode wiring 13 and the negative-electrode collector layer 5 into contact with each other.

Next, the positive-electrode wiring 14 and the positive-electrode collector layer 1, and the negative-electrode wiring 13 and the negative-electrode collector layer 5 are irradiated with an ultrasonic wave (or supplied with a current) through the substrate-side recess 40 and the battery-side recess 10, and through the substrate-side recess 41 and the battery-side recess 11, and thus the positive-electrode wiring 14 and the positive-electrode collector layer 1, and the negative-electrode wiring 13 and the negative-electrode collector layer 5 are welded to each other. As a result, the connected portions 50 and 60 illustrated in FIG. 3 are formed (see arrows of FIG. 7).

Finally, as illustrated in FIG. 4, the protective seal 18 is attached so as to stride the positive-electrode side connecting tab 30 and the substrate 101 and stride the negative-electrode-side connecting tab 31 and the substrate 101.

Accordingly, the mounted unit 200 is completed.

Thus, according to the second embodiment, the mounted unit 200 includes the non-aqueous secondary battery 100.

Therefore, the second embodiment exhibits the same effects as those of the first embodiment.

Further, according to the second embodiment, in the mounted unit 200, the non-aqueous secondary battery 100 is mounted on the substrate 101, and the negative-electrode wiring 13 and the negative-electrode collector layer 5, and the positive-electrode wiring 14 and the positive-electrode collector layer 1 are irradiated with an ultrasonic wave (or supplied with a current) through the substrate-side recess 40 and the battery-side recess 10, and through the substrate-side recess 41 and the battery-side recess 11, and thereby the negative-electrode wiring 13 and the negative-electrode collector layer 5, and the positive-electrode wiring 14 and the positive-electrode collector layer 1 are welded to each other to form the connected portions 50 and 60. As a result, the substrate 101 and the non-aqueous secondary battery 100 are electrically connected to each other.

Therefore, connection reliability can be further enhanced compared to the case where wiring and collector layers are connected through use of a solder, a rivet, or a conductive adhesive.

Next, a mounted unit 201 according to a third embodiment of this invention is described with reference to FIG. 8.

The third embodiment is obtained by integrally forming the negative-electrode collector layer 5 with the negative-electrode wiring 13 (that is, the negative-electrode wiring 13 also serves as the negative-electrode collector layer 5) in the second embodiment.

Note that, in the third embodiment, elements having functions similar to those of the second embodiment are denoted with the same reference numerals as those therein, and the descriptions thereof are omitted.

Figure 8:
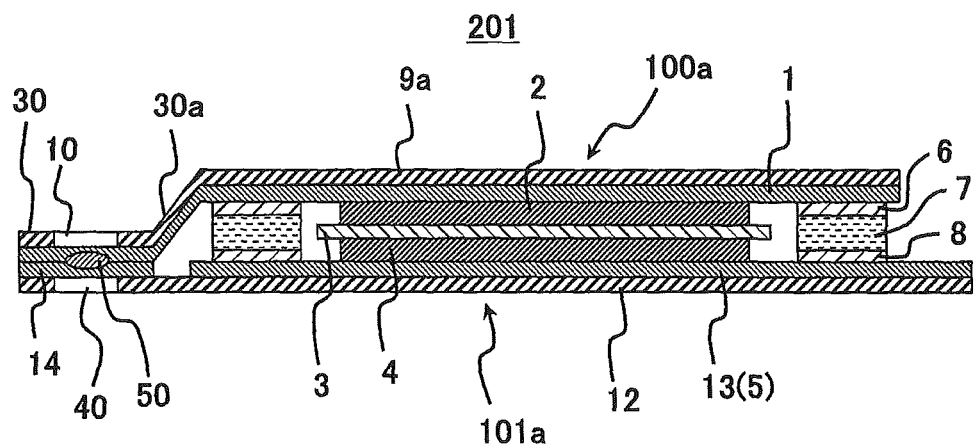
FIG. 8 is a sectional view illustrating a structure of a mounted unit 201 according to a third embodiment of this invention.

As illustrated in FIG. 8, the mounted unit 201 includes a substrate 101a and a non-aqueous secondary battery 100a, in which the negative-electrode collector layer 5 is integrally formed with the negative-electrode wiring 13. Therefore, the mounted unit 201 does not include the negative-electrode-side insulating layer 9b, the negative-electrode-side connecting tab 31, the battery-side recess 11, or the substrate-side recess 41.

As described above, the collector layers and the wiring layers are not necessarily required to be separate components and may be integrated.

With the above-mentioned structure, the thickness of the mounted unit 201 can be reduced compared to the case where the collector layers and the wiring layers are formed as separate components.

Further, the number of connected portions between the collector layers and the wiring layers can be reduced to further enhance connection reliability.

Note that, in the above-mentioned structure, for example, it is preferred that the substrate 101 side be formed of an LCP/metal foil structure, that is, the insulating substrate 12 be formed of an LCP and the negative-electrode wiring 13 (negative-electrode collector layer 5) be formed of a metal foil such as a copper foil from the viewpoint of reducing the thickness.

As described above, according to the third embodiment, the mounted unit 201 includes the substrate 101a and the non-aqueous secondary battery 100a mounted on the substrate 101a.

Thus, the third embodiment exhibits effects similar to those of the second embodiment.

Further, according to the third embodiment, in the mounted unit 201, the negative-electrode collector layer 5 is integrally formed with the negative-electrode wiring 13.

Therefore, the thickness of the mounted unit 201 can be reduced compared to the second embodiment.

Further, compared to the second embodiment, the number of the connected portions between the collector layers and the wiring layers can be reduced to further enhance connection reliability.

Next, a mounted unit 202 according to a fourth embodiment of this invention is described with reference to FIG. 9.

In the fourth embodiment, the positive-electrode wiring 14 and the positive-electrode collector layer 1 are also integrally formed, a non-aqueous secondary battery 100b is sealed with an insulating substrate and a sealing agent, and further, the non-aqueous secondary battery 100b and electronic components mounted thereon are sealed to form a card in the third embodiment.

Note that, in the fourth embodiment, elements having functions similar to those of the third embodiment are denoted with the same reference numerals as those therein, and the descriptions thereof are omitted.

First, a structure of the mounted unit 202 is described briefly.

Figure 9:
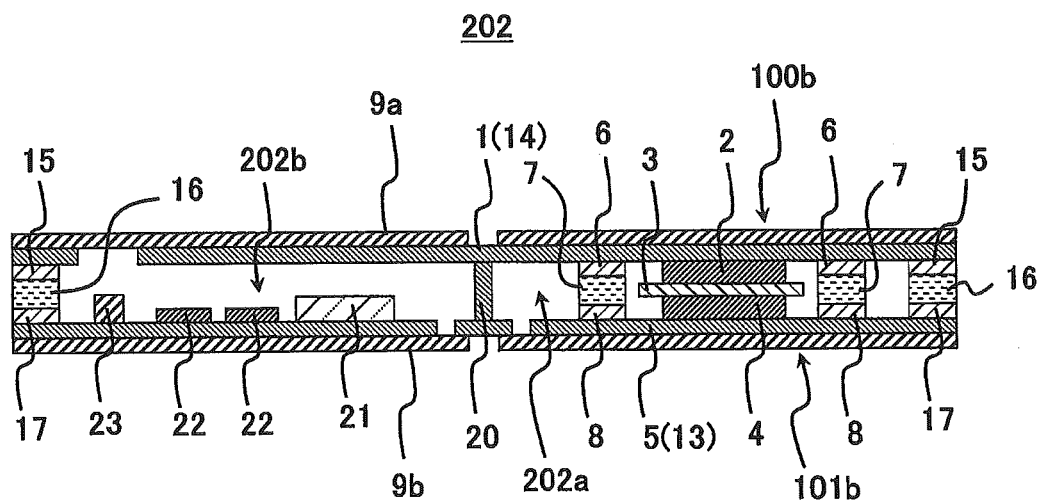
FIG. 9 is a sectional view illustrating a structure of a mounted unit 202 according to a fourth embodiment of this invention.

As illustrated in FIG. 9, in the mounted unit 202, the positive-electrode collector layer 1 and the negative-electrode collector layer 5 are integrated with the positive-electrode wiring 14 and the negative-electrode wiring 13, respectively.

Further, the non-aqueous secondary battery 100b and electronic components are mounted in the mounted unit 202, and the outer edge of the mounted unit 202 is sealed with a three-layered sealing agent (positive-electrode fusion layer 15, gas barrier layer 16, and negative-electrode fusion layer 17). Thus, the mounted unit 202 comprises a structure serving as a card (IC card).

Specifically, in the mounted unit 202, each of the positive-electrode-side insulating layer 9a and the negative-electrode-side insulating layer 9b comprises a structure also serving as the insulating substrate 12, and the positive-electrode collector layer 1 and the negative-electrode collector layer 5 also serve as the positive-electrode wiring 14 and the negative-electrode wiring 13, respectively.

Further, the mounted unit 202 comprises two regions 202a, 202b inside thereof. In the region 202a, the positive-electrode layer 2, the negative-electrode layer 4, and the separator 3 are provided so as to be surrounded by a first sealing agent (positive-electrode fusion layer 6, gas barrier layer 7, negative-electrode fusion layer 8), and thus the non-aqueous secondary battery 100b is formed. In the region 202b, electronic components such as an IC 21, a resistor 22, and a capacitor 23 are mounted on the negative-electrode collector layer 5 (and positive-electrode collector layer 1).

Further, the outer edge of the positive-electrode collector layer 1 and the negative-electrode collector layer 5, that is, the circumference of the positive-electrode collector layer 1 and the negative-electrode collector layer 5 is also sealed with a three-layered second sealing agent (positive-electrode fusion layer 15, gas barrier layer 16, negative-electrode fusion layer 17) in such a manner that the non-aqueous secondary battery 100b and the electronic components are surrounded by the second sealing agent.

Note that, an interposer 20 is provided on the positive-electrode collector layer 1 so that the positive-electrode collector layer 1 is connected to the negative-electrode-side insulating layer 9b.

Next, a method of producing the mounted unit 202 is described.

First, necessary electronic components (IC 21, resistor 22, and capacitor 23) are mounted on electric circuits (negative-electrode collector layer 5 and positive-electrode collector layer 1). Then, positive-electrode/negative-electrode active materials are molded by printing on each electric circuit to form the positive-electrode layer 2 and the negative-electrode layer 4. After that, the separator 3 and the three-layered first sealing agent (positive-electrode fusion layer 6, gas barrier layer 7, and negative-electrode fusion layer 8) are interposed in the resultant structure and an electrolytic solution is injected thereto. Then, the sealing agent portion is heat-sealed to complete the non-aqueous secondary battery 100b.

After that, the three-layered second sealing agent is interposed in the outer edge of the portion of the electric circuits provided with the non-aqueous secondary battery 100b and the electronic components and subjected to heat-sealing. Then, the upper and lower electric circuits are connected to each other by ultrasonic fusion or electric welding, and thus the mounted unit 202 is completed.

Thus, according to the fourth embodiment, the mounted unit 202 comprises the non-aqueous secondary battery 100b.

Therefore, the fourth embodiment exhibits the same effects as those of the third embodiment.

Further, according to the fourth embodiment, in the mounted unit 202, both the positive-electrode collector layer 1 and the negative-electrode collector layer 5 are integrated with wiring of a substrate, and electronic components are mounted.

Therefore, the mounted unit 202 serves as a card.

Next, a fifth embodiment of this invention is described with reference to FIG. 10.

The fifth embodiment is obtained by filling hollow portions of the regions 202a and 202b in a mounted unit 203 with a resin or the like in the fourth embodiment.

Note that, in the fifth embodiment, elements having functions similar to those of the fourth embodiment are denoted with the same reference numerals as those therein, and the descriptions thereof are omitted.

Figure 10:
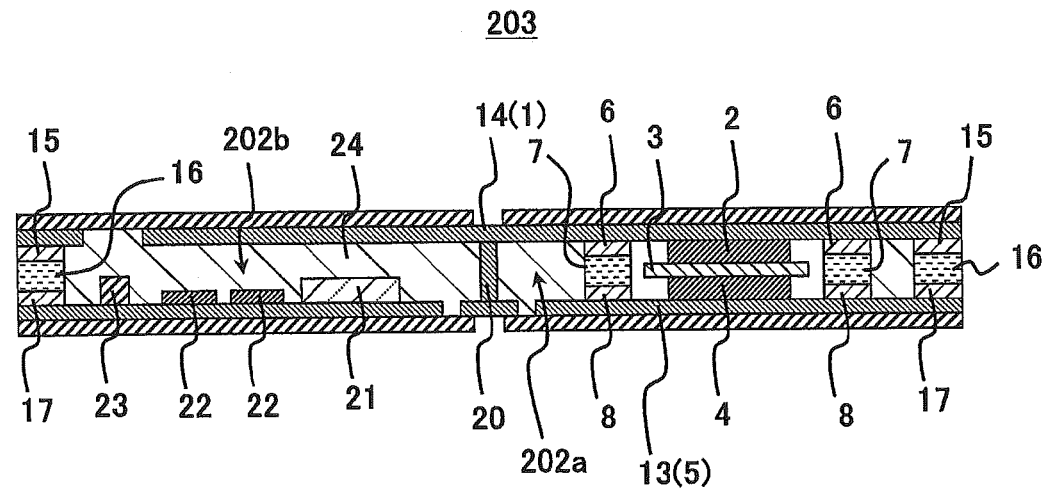
FIG. 10 is a sectional view illustrating a structure of a mounted unit 203 according to a fifth embodiment of this invention.

As illustrated in FIG. 10, in the mounted unit 203, the hollow portions of the regions 202a, 202b are filled with a resin 24.

The mounted unit 203 may comprise a structure in which the hollow portions are filled with a resin or the like as described above, and owing to such a structure, a card having both flexibility and strength can be produced at low cost.

Note that, as a material forming the resin 24, for example, there is given a three-layered sealing agent (positive-electrode fusion layer 15, gas barrier layer 16, negative-electrode fusion layer 17) used for the outer edge of the battery and the electric circuits.

As described above, according to the fifth embodiment, the mounted unit 203 comprises the non-aqueous secondary battery 100b.

Therefore, the fifth embodiment exhibits the same effects as those of the fourth embodiment.

Further, according to the fifth embodiment, the hollow portions in the mounted unit 203 are filled with the resin 24.

Therefore, the mounted unit 203 can be produced as a card having both flexibility and strength at low cost.

EXAMPLES

Next, production methods according to the embodiments are described by way of specific examples.

Examples

The non-aqueous secondary battery 100 according to this invention (illustrated in FIG. 1) was produced under the following conditions.

Example 1

90 wt % of lithium manganate having a spinel structure, 5 wt % of graphite powder having an average particle diameter of 6 μm and 2 wt % of acetylene black as conductivity-imparting agents, and 3 wt % of PVDF as a binder were weighed, and dispersed and mixed in N-methylpyrrolidone (hereinafter referred to as "NMP") to obtain a positive-electrode ink. The positive-electrode ink produced by the above-mentioned method was printed and applied to an aluminum foil having a thickness of 40 μm by screen printing, a rear surface of the aluminum foil having attached thereto a liquid crystal polyester having a thickness of 50 μm, and NMP, which was a dispersion solvent, was removed by heat-drying. After that, the resultant was subjected to compression molding with a roller press machine, and thus a positive electrode including the liquid crystal polyester and the aluminum foil and having a total thickness of 140 μm was produced.

As a negative-electrode active material, MCMB manufactured by Osaka Gas, Co., Ltd. graphitized at 2,800° C. was used. 88 wt % of MCMB, 2 wt % of acetylene black as a conductivity-imparting agent, and 10 wt % of PVDF as a binder were weighed, and dispersed and mixed in NMP to obtain a negative-electrode ink. The negative-electrode ink produced by the above-mentioned method was printed and applied to a copper foil having a thickness of 18 μm by screen printing, a rear surface of the copper foil having attached thereto a liquid crystal polyester having a thickness of 50 μm, and NMP, which was a dispersion solvent, was removed by heat-drying. After that, the resultant was subjected to compression molding with a roller press machine, and thus a negative electrode including the liquid crystal polyester and the copper foil and having a total thickness of 100 μm was produced.

The positive electrode and the negative electrode produced by the above-mentioned methods were opposed to each other with a porous film separator interposed therebetween. In this case, a film obtained by molding a sealing agent including three layers of "maleic anhydride-modified polypropylene/liquid crystal polyester/maleic anhydride-modified polypropylene" each having a thickness of 50 μm into a frame-like shape was interposed between the peripheral edges of the electrode layers. Three sides of the obtained rectangular laminate were fused by heating at a heater temperature of 190° C., and 60 μL of an electrolytic solution were injected through the remaining one open side. The composition of the electrolytic solution was a mixed solvent of EC and DEC (mixed volume ratio of EC/DEC=3/7) containing 1.0 M of $LiPF_6$ as a supporting electrolyte. The entire cell was reduced in pressure so as to impregnate a gap well with the electrolytic solution. After that, the remaining one side was fused by heating under reduced pressure to obtain a thin secondary battery.

Example 2

90 wt % of cobalt, aluminum-substituted lithium nickelate ($LiNi_{0.80}Co_{0.15}Al_{0.05}O_2$) having a layered rock-salt structure, 5 wt % of graphite powder and 2 wt % of acetylene black as conductivity-imparting agents, and 3 wt % of PVDF as a binder were weighed, and dispersed and mixed in N-methylpyrrolidone (hereinafter referred to as "NMP") to obtain a positive-electrode ink. The positive-electrode ink produced by the above-mentioned method was printed and applied to an aluminum foil having a thickness of 40 μm by screen printing, a rear surface of the aluminum foil having attached thereto a liquid crystal polyester having a thickness of 50 μm, and NMP, which was a dispersion solvent, was removed by heat-drying. After that, the resultant was subjected to compression molding with a roller press machine, and thus a positive electrode including the liquid crystal polyester and the aluminum foil and having a total thickness of 140 μm was produced.

As a negative-electrode active material, MCMB manufactured by Osaka Gas, Co., Ltd. graphitized at 2,800° C. was used. 88 wt % of MCMB, 2 wt % of acetylene black as a conductivity-imparting agent, and 10 wt % of PVDF as a binder were weighed, and dispersed and mixed in NMP to obtain a negative-electrode ink. The negative-electrode ink produced by the above-mentioned method was printed and applied to a copper foil having a thickness of 18 μm by screen printing, a rear surface of the copper foil having attached thereto a liquid crystal polyester having a thickness of 50 μm, and NMP, which was a dispersion solvent, was removed by heat-drying. After that, the resultant was subjected to compression molding with a roller press machine, and thus a negative electrode including the liquid crystal polyester and the copper foil and having a total thickness of 120 μm was produced.

The positive electrode and the negative electrode produced by the above-mentioned methods were opposed to each other with a porous film separator interposed therebetween. In this case, a film obtained by molding a sealing agent including three layers of "maleic anhydride-modified polyethylene/liquid crystal polyester/maleic anhydride-modified polyethylene" each having a thickness of 75 μm into a frame-like shape was interposed between the peripheral edges of the electrode layers. Three sides of the obtained rectangular laminate were fused by heating at a heater temperature of 150° C., and 60 μL of an electrolytic solution were injected through the remaining one open side. The composition of the electrolytic solution was a mixed solvent of EC and DEC (mixed volume ratio of EC/DEC=3/7) containing 1.0 M of LiPF$_6$ as a supporting electrolyte. The entire cell was reduced in pressure so as to impregnate a gap well with the electrolytic solution. After that, the remaining one side was fused by heating under reduced pressure to obtain a thin secondary battery.

Example 3

70% of an organic radical polymer, poly(2,2,6,6-tetramethylpiperidinyloxy-4-yl methacrylate), 14% of vapor grown carbon fiber, 7% of acetylene black, 8% of carboxymethyl cellulose, and 1% of Teflon (trademark) were weighed, and dispersed and mixed in water to obtain a positive-electrode ink. The positive-electrode ink produced by the above-mentioned method was printed and applied to an aluminum foil having a thickness of 40 μm by screen printing, a rear surface of the aluminum foil having attached thereto a liquid crystal polyester having a thickness of 50 μm, and water, which was a dispersion solvent, was removed by heat-drying. After that, the resultant was subjected to compression molding with a roller press machine, and thus a positive electrode including the liquid crystal polyester and the aluminum foil and having a total thickness of 170 μm was produced.

As a negative-electrode active material, MCMB manufactured by Osaka Gas, Co., Ltd. graphitized at 2,800° C. was used. 88 wt % of MCMB, 2 wt % of acetylene black as a conductivity-imparting agent, and 10 wt % of PVDF as a binder were weighed, and dispersed and mixed in NMP to obtain a negative-electrode ink. The negative-electrode ink produced by the above-mentioned method was printed and applied to a copper foil having a thickness of 18 μm by screen printing, a rear surface of the copper foil having attached thereto a liquid crystal polyester having a thickness of 50 μm, and NMP, which was a dispersion solvent, was removed by heat-drying. After that, the resultant was subjected to compression molding with a roller press machine, and thus a negative electrode including the liquid crystal polyester and the copper foil and having a total thickness of 100 μm was produced.

The positive electrode and the negative electrode produced by the above-mentioned methods were opposed to each other with a porous film separator interposed therebetween. In this case, a film obtained by molding a sealing agent including three layers of "glycidyl methacrylate-modified polyethylene/liquid crystal polyester/glycidyl methacrylate-modified polyethylene" each having a thickness of 100 μm into a frame-like shape was interposed between the peripheral edges of the electrode layers. Three sides of the obtained rectangular laminate were fused by heating at a heater temperature of 150° C., and 60 μL of an electrolytic solution were injected through the remaining one open side. The composition of the electrolytic solution was a mixed solvent of EC and DEC (mixed volume ratio of EC/DEC=3/7) containing 1.0 M of LiPF$_6$ as a supporting electrolyte. The entire cell was reduced in pressure so as to impregnate a gap well with the electrolytic solution. After that, the remaining one side was fused by heating under reduced pressure to obtain a thin secondary battery.

Comparative Examples

Next, as Comparative Examples, non-aqueous secondary batteries were produced under different conditions from those of Examples 1 to 3.

Comparative Example 1

90 wt % of lithium manganate having a spinel structure, 5 wt % of graphite powder having an average particle diameter of 6 μm and 2 wt % of acetylene black as conductivity-imparting agents, and 3 wt % of PVDF as a binder were weighed, and dispersed and mixed in N-methylpyrrolidone (hereinafter referred to as "NMP") to obtain a positive-electrode ink. The positive-electrode ink produced by the above-mentioned method was printed and applied to an aluminum foil having a thickness of 40 μm by screen printing, a rear surface of the aluminum foil having attached thereto a liquid crystal polyester having a thickness of 50 μm, and NMP, which was a dispersion solvent, was removed by heat-drying. After that, the resultant was subjected to compression molding with a roller press machine, and thus a positive electrode including the liquid crystal polyester and the aluminum foil and having a total thickness of 140 μm was produced.

As a negative-electrode active material, MCMB manufactured by Osaka Gas, Co., Ltd. graphitized at 2,800° C. was used. 88 wt % of MCMB, 2 wt % of acetylene black as a conductivity-imparting agent, and 10 wt % of PVDF as a binder were weighed, and dispersed and mixed in NMP to obtain a negative-electrode ink. The negative-electrode ink produced by the above-mentioned method was printed and applied to a copper foil having a thickness of 18 μm by screen printing, a rear surface of the copper foil having attached thereto a liquid crystal polyester having a thickness of 50 μm, and NMP, which was a dispersion solvent, was removed by heat-drying. After that, the resultant was subjected to compression molding with a roller press machine, and thus a negative electrode including the liquid crystal polyester and the copper foil and having a total thickness of 100 µm was produced.

The positive electrode and the negative electrode produced by the above-mentioned methods were opposed to each other with a porous film separator interposed therebetween. In this case, a film obtained by molding a sealing agent including a maleic anhydride-modified polyethylene having a thickness of 50 µm into a frame-like shape was interposed between the peripheral edges of the electrode layers. Three sides of the obtained rectangular laminate were fused by heating at a heater temperature of 150° C., and 60 µL of an electrolytic solution were injected through the remaining one open side. The composition of the electrolytic solution was a mixed solvent of EC and DEC (mixed volume ratio of EC/DEC=3/7) containing 1.0 M of $LiPF_6$ as a supporting electrolyte. The entire cell was reduced in pressure so as to impregnate a gap well with the electrolytic solution. After that, the remaining one side was fused by heating under reduced pressure to obtain a thin secondary battery.

Comparative Example 2

90 wt % of lithium manganate having a spinel structure, 5 wt % of graphite powder having an average particle diameter of 6 µm and 2 wt % of acetylene black as conductivity-imparting agents, and 3 wt % of PVDF as a binder were weighed, and dispersed and mixed in N-methylpyrrolidone (hereinafter referred to as "NMP") to obtain a positive-electrode ink. The positive-electrode ink produced by the above-mentioned method was printed and applied to an aluminum foil having a thickness of 40 µm by screen printing, a rear surface of the aluminum foil having attached thereto a liquid crystal polyester having a thickness of 50 µm, and NMP, which was a dispersion solvent, was removed by heat-drying. After that, the resultant was subjected to compression molding with a roller press machine, and thus a positive electrode including the liquid crystal polyester and the aluminum foil and having a total thickness of 140 µm was produced.

As a negative-electrode active material, MCMB manufactured by Osaka Gas, Co., Ltd. graphitized at 2,800° C. was used. 88 wt % of MCMB, 2 wt % of acetylene black as a conductivity-imparting agent, and 10 wt % of PVDF as a binder were weighed, and dispersed and mixed in NMP to obtain a negative-electrode ink. The negative-electrode ink produced by the above-mentioned method was printed and applied to a copper foil having a thickness of 18 µm by screen printing, a rear surface of the copper foil having attached thereto a liquid crystal polyester having a thickness of 50 µm, and NMP, which was a dispersion solvent, was removed by heat-drying. After that, the resultant was subjected to compression molding with a roller press machine, and thus a negative electrode including the liquid crystal polyester and the copper foil and having a total thickness of 100 µm was produced.

The positive electrode and the negative electrode produced by the above-mentioned methods were opposed to each other with a porous film separator interposed therebetween. In this case, a film obtained by molding a sealing agent including a liquid crystal polyester having a thickness of 50 µm into a frame-like shape was interposed between the peripheral edges of the electrode layers. An attempt was made to fuse three sides of the obtained rectangular laminate by heating at a heater temperature of 190° C. However, the three sides were not able to be fused satisfactorily due to the excessively high melting point of the liquid crystal polyester.

Comparative Example 3

90 wt % of lithium manganate having a spinel structure, 5 wt % of graphite powder having an average particle diameter of 6 µm and 2 wt % of acetylene black as conductivity-imparting agents, and 3 wt % of PVDF as a binder were weighed, and dispersed and mixed in N-methylpyrrolidone (hereinafter referred to as "NMP") to obtain a positive-electrode ink. The positive-electrode ink produced by the above-mentioned method was printed and applied to an aluminum foil having a thickness of 10 µm by screen printing, a rear surface of the aluminum foil having attached thereto a liquid crystal polyester having a thickness of 50 µm, and NMP, which was a dispersion solvent, was removed by heat-drying. After that, the resultant was subjected to compression molding with a roller press machine, and thus a positive electrode including the liquid crystal polyester and the aluminum foil and having a total thickness of 140 µm was produced.

As a negative-electrode active material, MCMB manufactured by Osaka Gas, Co., Ltd. graphitized at 2,800° C. was used. 88 wt % of MCMB, 2 wt % of acetylene black as a conductivity-imparting agent, and 10 wt % of PVDF as a binder were weighed, and dispersed and mixed in NMP to obtain a negative-electrode ink. The negative-electrode ink produced by the above-mentioned method was printed and applied to a copper foil having a thickness of 18 µm by screen printing, a rear surface of the copper foil having attached thereto a liquid crystal polyester having a thickness of 50 µm, and NMP, which was a dispersion solvent, was removed by heat-drying. After that, the resultant was subjected to compression molding with a roller press machine, and thus a negative electrode including the liquid crystal polyester and the copper foil and having a total thickness of 100 µm was produced.

The positive electrode and the negative electrode produced by the above-mentioned methods were opposed to each other with a porous film separator interposed therebetween. In this case, a film obtained by molding a sealing agent including three layers of "glycidyl methacrylate-modified polyethylene/liquid crystal polyester/glycidyl methacrylate-modified polyethylene" each having a thickness of 50 µm into a frame-like shape was interposed between the peripheral edges of the electrode layers. Three sides of the obtained rectangular laminate were fused by heating at a heater temperature of 150° C., and 60 µL of an electrolytic solution were injected through the remaining one open side. The composition of the electrolytic solution was a mixed solvent of EC and DEC (mixed volume ratio of EC/DEC=3/7) containing 1.0 M of $LiPF_6$ as a supporting electrolyte. The entire cell was reduced in pressure so as to impregnate a gap well with the electrolytic solution. After that, the remaining one side was fused by heating under reduced pressure to obtain a thin secondary battery.

Comparative Example 4

90 wt % of lithium manganate having a spinel structure, 5 wt % of graphite powder having an average particle diameter of 6 µm and 2 wt % of acetylene black as conductivity-imparting agents, and 3 wt % of PVDF as a binder were weighed, and dispersed and mixed in N-methylpyrrolidone (hereinafter referred to as "NMP") to obtain a positive-electrode ink. The positive-electrode ink produced by the above-mentioned method was printed and applied to an aluminum foil having a thickness of 70 μm by screen printing, a rear surface of the aluminum foil having attached thereto a liquid crystal polyester having a thickness of 50 μm, and NMP, which was a dispersion solvent, was removed by heat-drying. After that, the resultant was subjected to compression molding with a roller press machine, and thus a positive electrode including the liquid crystal polyester and the aluminum foil and having a total thickness of 140 μm was produced.

As a negative-electrode active material, MCMB manufactured by Osaka Gas, Co., Ltd. graphitized at 2,800° C. was used. 88 wt % of MCMB, 2 wt % of acetylene black as a conductivity-imparting agent, and 10 wt % of PVDF as a binder were weighed, and dispersed and mixed in NMP to obtain a negative-electrode ink. The negative-electrode ink produced by the above-mentioned method was printed and applied to a copper foil having a thickness of 18 μm by screen printing, a rear surface of the copper foil having attached thereto a liquid crystal polyester having a thickness of 50 μm, and NMP, which was a dispersion solvent, was removed by heat-drying. After that, the resultant was subjected to compression molding with a roller press machine, and thus a negative electrode including the liquid crystal polyester and the copper foil and having a total thickness of 100 μm was produced.

The positive electrode and the negative electrode produced by the above-mentioned methods were opposed to each other with a porous film separator interposed therebetween. In this case, a film obtained by molding a sealing agent including three layers of "maleic anhydride-modified polypropylene/liquid crystal polyester/maleic anhydride-modified polypropylene" each having a thickness of 100 μm into a frame-like shape was interposed between the peripheral edges of the electrode layers. Three sides of the obtained rectangular laminate were fused by heating at a heater temperature of 190° C., and 60 μL of an electrolytic solution were injected through the remaining one open side. The composition of the electrolytic solution was a mixed solvent of EC and DEC (mixed volume ratio of EC/DEC=3/7) containing 1.0 M of $LiPF_6$ as a supporting electrolyte. The entire cell was reduced in pressure so as to impregnate a gap well with the electrolytic solution. After that, the remaining one side was fused by heating under reduced pressure to obtain a thin secondary battery.

<Evaluation of Cell>

In the procedure of Comparative Example 2, a cell was not able to be produced as described above. Therefore, the cells produced in Examples 1 to 3 and Comparative Examples 1, 3, and 4 were put in a thermostat chamber at 20° C., and initial charge and discharge were conducted at a rate of 0.1 C. As a result, it was found that the capacity was not obtained in the cell produced in Comparative Example 1, and short-circuit occurred between the positive and negative electrodes. After that, charge and discharge were repeated at a rate of 1 C in the cells produced in Examples 1 to 3 and Comparative Examples 3 and 4. As a result, it was found that the degradation in capacity was conspicuous only in the cell of Comparative Example 3. The stability, number of short-circuits, and calculated energy density of each cell are summarized in Table 1.

Note that, regarding the calculated energy density in Table 1, assuming that the calculated energy density of Example 1 is 1.0, the case where the calculated energy density is 0.5 or more is indicated by "○", the case where the calculated energy density is 0.2 to 0.3 is indicated by "Δ", and the case where the calculated energy density is 0.2 or less is indicated by "x".

TABLE 1

| Specific Example | Stability | Number of short-circuits | Calculated energy density |
|---|---|---|---|
| Example | ○ | 0/5 | ○ |
| Example | ○ | 0/3 | ○ |
| Example | ○ | 0/3 | ○ |
| Comparative Example | — | 2/2 | ○ |
| Comparative Example | x | — | ○ |
| Comparative Example | Δ | 0/2 | ○ |
| Comparative Example | ○ | 0/2 | Δ |

INDUSTRIAL APPLICABILITY

The non-aqueous electrolyte secondary battery according to this invention can satisfy the high adhesiveness with both electrode collectors, the high short-circuit prevention reliability, and the sufficient gas barrier property simultaneously although being a thin battery not using an aluminum laminate film exterior body. Therefore, the non-aqueous electrolyte secondary battery can be used widely as a thin non-aqueous electrolyte secondary battery which is easy to use. Examples of the applications of this invention include an IC card, an RFID tag, various sensors, and mobile telephone equipment.

Note that, this invention is not limited to the above-mentioned embodiments and examples.

Needless to say, those skilled in the art understand that this invention can be variously modified or improved within the scope of this invention and those modified or improved examples are also included in this invention.

For example, in the second and third embodiments of this invention, the positive-electrode-side insulating layer 9a and the positive-electrode collector layer 1 are opposed to the substrate with the negative-electrode-side insulating layer 9b (negative-electrode collector layer 5) interposed therebetween, and the positive-electrode-side connecting tab 30 is bent into a crank shape. Thus, the positive-electrode collector layer 1 and the positive-electrode wiring 14 are connected to each other. However, this invention may include a structure in which the positive electrode and the negative electrode are reversed.

Specifically, the negative-electrode collector layer 5 and the negative-electrode wiring 13 may be connected to each other by opposing the negative-electrode-side insulating layer 9b and the negative-electrode collector layer 5 to the substrate with the positive-electrode-side insulating layer 9a (positive-electrode collector layer 1) interposed therebetween and bending the negative-electrode-side connecting tab 31 into a crank shape.

This application claims priority based on Japanese Patent Application No. 2011-105874 filed on May 11, 2011, the disclosure of which is incorporated herein by reference in its entirety.

DESCRIPTION OF SYMBOLS 1 positive-electrode collector layer
2 positive-electrode layer
3 separator
4 negative-electrode layer
5 negative-electrode collector layer
6 positive-electrode fusion layer
7 gas barrier layer
8 negative-electrode fusion layer
9a positive-electrode-side insulating layer
9b negative-electrode-side insulating layer 10 battery-side recess
11 battery-side recess
12 insulating substrate
13 negative-electrode wiring
14 positive-electrode wiring
15 positive-electrode fusion layer
16 gas barrier layer
17 negative-electrode fusion layer
18 protective seal
20 interposer
22 resistor
23 capacitor
24 resin
30 positive-electrode-side connecting tab
30a root
31 negative-electrode-side connecting tab
40 substrate-side recess
41 substrate-side recess
50 connected portion
60 connected portion
100 non-aqueous secondary battery
100a non-aqueous secondary battery
100b non-aqueous secondary battery
101 substrate
101a substrate
200 mounted unit
201 mounted unit
202 mounted unit
202a region
202b region
203 mounted unit

The invention claimed is:

1. A non-aqueous secondary battery, comprising:
a positive-electrode collector layer;
a positive-electrode layer formed on one surface of the positive-electrode collector layer;
a negative-electrode collector layer;
a negative-electrode layer formed on one surface of the negative-electrode collector layer so as to be opposed to the positive-electrode layer;
a separator including an electrolytic solution provided between the positive-electrode layer and the negative-electrode layer;
a positive-electrode-side insulating layer formed on another surface of the positive-electrode collector layer; and
a negative-electrode-side insulating layer formed on another surface of the negative-electrode collector layer,
wherein an inner surface of a peripheral edge of the positive-electrode collector layer and an inner surface of a peripheral edge of the negative-electrode collector layer are joined with a sealing agent interposed therebetween, the sealing agent comprising a multilayer structure including at least a positive-electrode fusion layer, a gas barrier layer, and a negative-electrode fusion layer,
wherein the positive-electrode-side insulating layer and/or the negative-electrode-side insulating layer has a battery-side recess provided on a surface on an opposite side of a surface on which the positive-electrode collector layer and/or the negative-electrode collector layer is provided, and
wherein the battery-side recess is not opened, such that the insulating layer remains on a bottom surface of the battery-side recess, and the insulating layer on the bottom surface of the battery-side recess is thinner than the insulating layer located other than on the bottom surface of the battery-side recess.

2. A non-aqueous secondary battery according to claim 1, wherein the gas barrier layer contains a liquid crystal polyester resin as a main component.

3. A non-aqueous secondary battery according to claim 1, wherein the positive-electrode fusion layer and the negative-electrode fusion layer each contain at least one kind of resin selected from a modified polypropylene resin, a modified polyethylene resin, and an ionomer resin as a main component.

4. A non-aqueous secondary battery according to claim 1, wherein the positive-electrode collector layer contains aluminum as a main component, and the negative-electrode collector layer contains copper as a main component.

5. A non-aqueous secondary battery according to claim 1, wherein the positive-electrode collector layer has a thickness of 12 $\mu$m or more and 68 $\mu$m or less.

6. A non-aqueous secondary battery according to claim 1, wherein the positive-electrode layer contains a nitroxyl radical polymer.

7. A non-aqueous secondary battery according to claim 1, wherein at least one of the positive-electrode-side insulating layer and the negative-electrode-side insulating layer includes a connecting tab, and
wherein the battery-side recess is provided on the connecting tab.

8. A non-aqueous secondary battery according to claim 1, wherein the positive-electrode-side insulating layer and the negative-electrode-side insulating layer respectively include a positive-electrode-side connecting tab and a negative-electrode-side connecting tab,
wherein the battery-side recess is provided on each of the positive-electrode-side connecting tab and the negative-electrode-side connecting tab, and
wherein the positive-electrode-side connecting tab and the negative-electrode-side connecting tab are arranged at different positions in a planar view.

9. A non-aqueous secondary battery according to claim 8, wherein the positive-electrode-side insulating layer and the negative-electrode-side insulating layer each comprise a rectangular part, and
wherein the positive-electrode-side connecting tab and the negative-electrode-side connecting tab are provided so as to protrude respectively from opposed sides of the rectangular parts.

10. A non-aqueous secondary battery according to claim 9, wherein at least a part of the negative-electrode collector layer is covered with a material having corrosion resistance.

11. A non-aqueous secondary battery according to claim 10, wherein the material covering the at least a part of the negative-electrode collector layer comprises nickel.

12. A non-aqueous secondary battery according to claim 11, wherein the material covering the at least a part of the negative-electrode collector layer comprises nickel and gold.

13. A mounted unit, comprising:
an insulating substrate;
positive-electrode wiring and negative-electrode wiring provided on one surface of the insulating substrate;
substrate-side recesses respectively provided on another surface of the insulating substrate; and
the non-aqueous secondary battery according to claim 1 provided on the insulating substrate,
wherein the substrate-side recess and the battery-side recess are arranged so as to overlap each other in a planar view, and portions of the positive-electrode wiring and the positive-electrode collector layer, and/or portions of the negative-electrode wiring and the negative-electrode collector layer, which are respectively opposed to the substrate-side recess and the battery-side recess, are connected to each other.

14. A mounted unit according to claim 13, wherein the positive-electrode wiring and the positive-electrode collector layer, and/or the negative-electrode wiring and the negative-electrode collector layer are connected to each other by radiating an ultrasonic wave or supplying a current between the substrate-side recess and the battery-side recess.

15. A mounted unit according to claim 14, wherein at least one of the positive-electrode-side insulating layer and the negative-electrode-side insulating layer includes a connecting tab,
wherein the battery-side recess is provided on the connecting tab,
wherein one of the positive-electrode-side insulating layer and the negative-electrode-side insulating layer, including the connecting tab, is opposed to the insulating substrate with another one of the positive-electrode-side insulating layer and the negative-electrode-side insulating layer interposed therebetween, and
wherein the connecting tab is bent in a crank shape to be brought into contact with the positive-electrode wiring or the negative-electrode wiring.

16. A mounted unit according to claim 15, wherein the another one of the positive-electrode-side insulating layer and the negative-electrode-side insulating layer further includes a connecting tab, and
wherein the another one of the positive-electrode collector layer and the negative-electrode collector layer is brought into contact with the positive-electrode wiring or the negative-electrode wiring by bending a portion exposed from the battery-side recess into the battery-side recess.

17. A non-aqueous secondary battery according to claim 1, wherein each of the positive-electrode-side insulating layer and the negative-electrode-side insulating layer includes a battery-side recess provided on a surface on an opposite side of a surface on which the positive-electrode collector layer and/or the negative-electrode collector layer is provided.

18. A non-aqueous secondary battery according to claim 1, wherein each of the positive-electrode-side insulating layer and the negative-electrode-side insulating layer includes a battery-side recess provided on a surface on an opposite side of a surface on which the positive-electrode collector layer and the negative-electrode collector layer is provided.

19. A non-aqueous secondary battery according to claim 1, wherein the insulating layer remains on the bottom surfaces of the battery-side recesses, and the insulating layer on the bottom surfaces of the battery-side recesses is thinner than the insulating layer located other than the bottom surfaces of the battery-side recesses.

* * * * *